Dec. 28, 1965  M. S. CROWLEY  3,226,240
CALCIUM ALUMINATE CEMENT COMPOSITION
Filed Jan. 28, 1963
EFFECT OF CLAYS AND CLAY CONTENT ON STRENGTH OF REFRACTORY CONCRETE
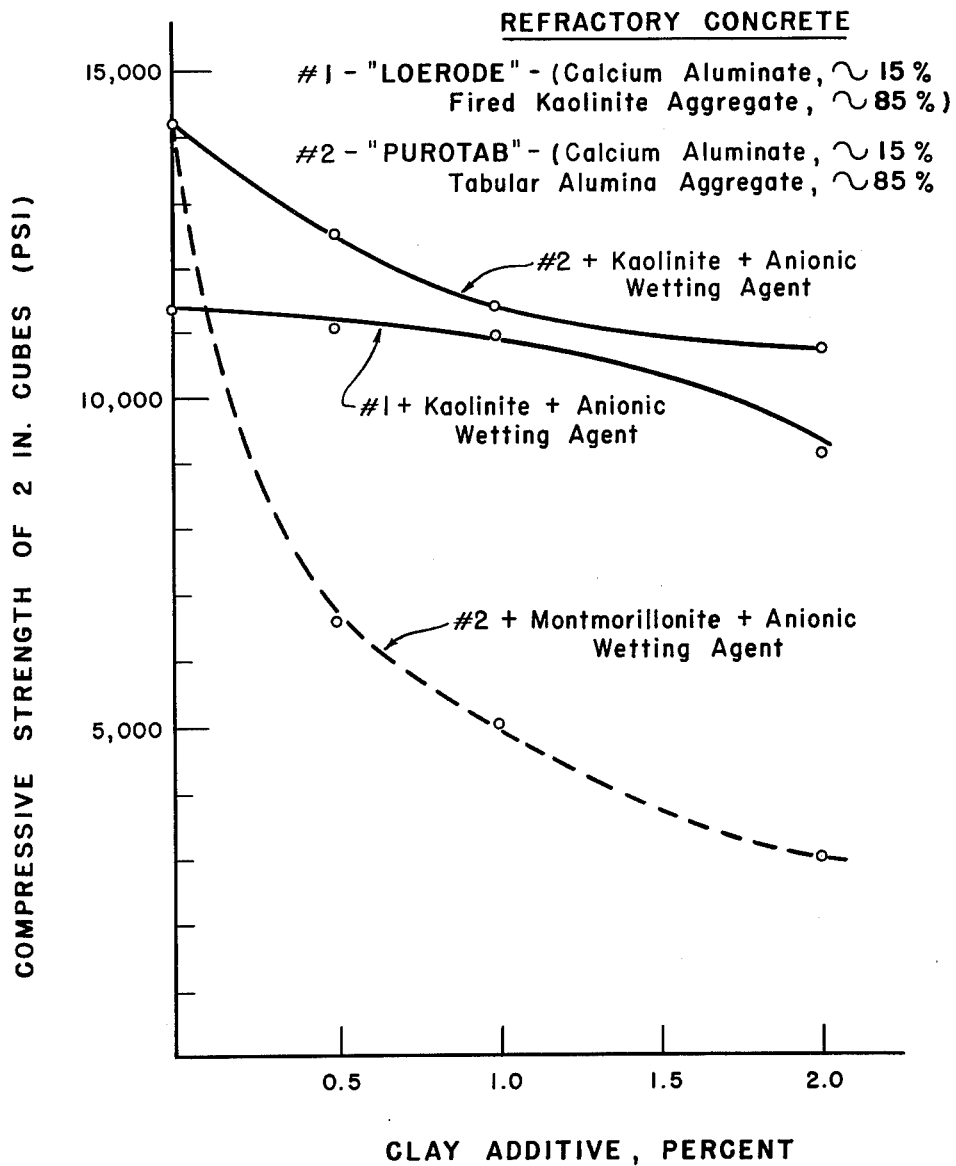
INVENTOR.
Michael S. Crowley
BY
ATTORNEY

United States Patent Office 3,226,240
Patented Dec. 28, 1965

3,226,240
CALCIUM ALUMINATE CEMENT COMPOSITION
Michael S. Crowley, Chicago Heights, Ill., assignor to Standard Oil Company, Chicago, Ill., a corporation of Indiana
Filed Jan. 28, 1963, Ser. No. 254,143
6 Claims. (Cl. 106—64)

This invention relates to castable refractory concretes, and more particularly concerns improvements relating to pure calcium aluminate cement base castable concretes.

Calcium aluminate concretes, normally composed of a calcium aluminate cement base and a refractory aggregate, are in general use as refractories in situations where exceptional mechanical strength and erosion resistance are required. The preferred calcium-aluminate cements are the so-called pure calcium aluminates, in which the concentration of impurities such as iron, magnesium, and sodium are each well below about 1%, and in which silicon, copper, manganese, and phosphorous are each below about 0.1%. Pure calcium aluminates are made by calcining chemical grade (97+%) limestone and Bayer (99+%) alumina; the re-hydrated cement is exceptionally resistant to erosion.

An unfortunate and well-recognized limitation of pure calcium aluminate cement base concretes is that they are dilatant, and lack sufficient plasticity to be applied to vertical and overhead surfaces. As a consequence, they cannot be applied to these surfaces unless expensive casting forms are used. In other words, they are true "castables," but unlike other castables cannot be applied by hand laying.

A number of techniques have heretofore been proposed for increasing the plasticity of pure calcium aluminate cement base concretes. While these have often been successful, they have at the same time resulted in a substantial loss of erosion resistance of the concrete. A major object of the invention is to provide an improved pure calcium aluminate cement base castable concrete having exceptional plasticity, which retains most if not all of the strength of the untreated concrete.

Briefly, according to the invention, pure calcium aluminate cement base castable concretes, which normally are difficult to apply to vertical and overhead surfaces, are improved as to plasticity and thereby rendered applicable to such surfaces, by incorporating therein minor amounts of a predominantly kaolinitic clay and an anionic wetting agent. These additives are advantageously dry-mixed with the cement base and aggregate before adding water. It is a particular advantage of the invention that no additional water is necessary to hydrate the clay and the wetting agent, so that the final concrete, after it hardens, retains substantially all of the strength and erosion resistance of an un-treated calcium aluminate base concrete.

The invention will be discussed in connection with the attached single figure, comparing the compressive strength of the calcium aluminate base concretes containing predominantly kaolinitic and predominantly montmorillonitic clays.

The kaolinitic clays for use herewith are those clays which are predominantly, i.e. 50% or more, made up of the mineral kaolinite $(Al_2Si_2O_5(OH)_4$, or $$Al_2O_3 \cdot 2SiO_2 \cdot 2H_2O)$$

Kaolinite is a layer-lattice silicate, with the particles being in the form of hexagonal platelets and having a size below about two microns. The predominantly kaolinitic clays are non-swelling when water is added. Examples of such clays are fire clay, ball clay, flint clay (containing quartz particles), etc.

The amount of predominantly kaolinitic clay which is to be used will depend somewhat on the physical and chemical properties of the calcium aluminate cement base and of the aggregate, and can best be determined by empirical testing for each case. The criterion is that only enough clay and wetting agent should be added to increase the plasticity from the normal dilatant condition to a texture resembling that of any good plastic cement. In general, clay concentrations within the range of about 0.1 to about 2.0 weight percent of the calcium aluminate concrete (water free basis) will be suitable, with concentration of between about 0.5 and about 1.5 percent being usually effective for most concretes.

The other additive of the present invention is an anionic wetting agent (see Surface Active Agents, in Kirk and Othmer's "Encyclopedia of Chemical Technology," vol. 13, pages 513–536, esp. 521–528). Anionic wetting agents have been found to be substantially superior to either the non-ionic or cationic agents with respect to their ability to maintain concrete erosion resistance and compressive strength, while also maintaining desirable clay properties such as plastic deformability, clay filterability, and clay sedimentation characteristics. The anionic wetting agents, or anionic surfactants, are molecules made up of a relatively large hydrophobic organic part and a small polar hydrophylic cation; typical anionic wetting agents are the sodium salts of alkyl aryl sulfonic acids, such as the sodium salt of dodecylbenzene sulfonic acid, or the sulfated alcohols (see Kirk and Othmer, above). The anionic wetting agents are advantageously used at a concentration within the range of about 0.05 to about 3 weight percent based on the clay, optimally about 0.1–2 weight percent, but as in the case of the clay itself, experimentation may be necessary to establish the true optimum for a given cement.

Calcium aluminate cements (see Calcium Aluminate cement) in Kirk and Othmer encyclopedia, above, vol. 3, pages 431–435) are prepared by calcining and melting a mixture of limestone and alumina. For the "pure" calcium aluminates, the limestone is a chemical grade of at least about 97% purity, and the alumina is Bayer alumina of at least about 99% purity. After calcination, the calcium aluminate is quenched and pulverized.

Calcium aluminates can be made in a wide range of calcium oxide to alumina oxide ratios, but at present the monocalcium monoaluminate ($CaO \cdot Al_2O_3$, or "CA") is most commonly available (Alcoa "CA"). When water is added, the calcium aluminate hydrates and sets to form the hardened paste.

The calcium aluminate cement is ordinarily mixed with a refractory aggregate such as ground tabular alumina, calcined fire clay, silicon carbide, synthetic mullite, synthetic magnesia alumina spinel, or other refractory compounds which are suitable at the expected temperature, chemical environment and erosive conditions of use. While the proportion of calcium aluminate cement to aggregate will vary considerably, e.g. from about 10% cement to about 30% cement, most commercial mixtures are composed of about 15–20 weight percent calcium aluminate cement and about 80–85% refractory aggregate.

It has been found that optimum practice of the invention dictates that the wetting agent and the predominantly kaolinitic clay be dry-mixed together so as to effectively disperse the (solid) wetting agent, which will constitute only a trace amount in the final cements. Then, the mixture of clay and surfactant is dry-mixed with the dry calcium aluminate cement and aggregate in the usual manner, and finally the entire intimate mixture is blended with water. Water will ordinarily constitute somewhere between about ten and twenty weight percent of the final mixture which is applied as a refractory concrete, but depending upon the particular formulation of the concrete may require some adjustment at the construction site.

A particular advantage of the invention, and one which is realized when the clay and surfactant are dry-mixed with the cement and aggregate before water is added, is that the clay and wetting agent require no additional water. This is somewhat unusual, as the clay by itself would require very substantial amounts of water to become a plastic mass. However, as the data below indicate, there is no need for substantial additional water.

To demonstrate the effectiveness of a kaolinitic clay and an anionic wetting agent, a series of experiments was run utilizing commercial pure calcium aluminate cement base castable concretes supplied by Kaiser Refractories Inc. The mixture of cement base and aggregate in each case consisted of about 15% cement; the aggregates were tabular alumina in the case of "Purotab" and fired kaolinite aggregate in the case of "Lo-Erode." A screen analysis on "Purotab," as received was as follows:

PUROTAB CONCRETE

| Screen size: | Percent |
|---|---|
| +4 mesh | 0.0 |
| −4 +8 | 17.1769 |
| −8 +14 | 37.3018 |
| −14 +28 | 15.7966 |
| −28 +48 | 7.3243 |
| −48 +100 | 5.0679 |
| −100 +200 | 4.5812 |
| −200 +325 | 5.1318 |
| −325 | 8.3121 |
| | 100 |

A series of concretes was made utilizing the quantities indicated below of "Purotab" and water and "Lo-Erode" and water, with the indicated proportions of kaolinitic clay. The anionic wetting agent was Monsanto's Santomerse No. 85, an alkyl aryl sulfonate, in the proportion of 1% wetting agent based on the kaolinite clay. It is particularly noted that the amount of water necessary to produce a putty-like and highly workable mixture remains substantially constant, notwithstanding the incorporation of fairly large amounts of clay and wetting agent; even at clay concentrations of up to 8%, only a small additional amount of water was necessary.

Table II

[Clay, wt. percent]

| | 0 | 0.5 | 1.0 | 2.0 |
|---|---|---|---|---|
| Water, cc | 120 | 125 | 125 | 127 |
| "Purotab," gm | 1,200 | 1,200 | 1,200 | 1,200 |

Table III

[Clay, wt. percent]

| | 0 | 0.5 | 1.0 | 2.0 |
|---|---|---|---|---|
| Water, cc | 150 | 150 | 155 | 160 |
| "Lo-Erode," gm | 1,200 | 1,200 | 1,200 | 1,200 |

After permitting the concretes to harden, compressive strengths on 2″ cubes were obtained. The compressive strength of a concrete correlates directly with its erosion resistance, and accordingly the retention of compressive strength indicates retention of erosion resistance in use.

The appended figure clearly shows that a kaolinitic clay permits almost complete retention of compressive strength of the hardened concrete, whereas the montmorillonitic clay effects several times as much strength reductions at any given clay concentration. The data points on the two upper curves correspond with the compositions of Tables II and III above.

A composition according to the invention was field tested in a fluid catalytic cracking unit, in which rapidly moving gas containing "fluidized" particulate silica-alumina is present. In this erosive and high temperature environment, only pure calcium aluminate concretes provide satisfactory life, and it had heretofore been the practice to install refractory liners with the use of temporary forms and ramming techniques on the vertical and overhead surfaces. By employing 1% of a kaolinitic clay, containing 1% based on clay of Santomerse No. 85 alkyl aryl sulfonate, a plastic mixture was obtained which was easily applied to the vertical and overhead vessel surfaces without the need for forms. Installation proceeded uneventfully. Thus far the concrete has given excellent service.

From the foregoing, it is evident that there has been provided in accordance with the invention an outstanding technique for increasing the plasticity and workability of pure calcium aluminate based concretes. By employing the inventive technique, these excellent concretes may be used in applications where their exceptional refractory and erosion-resistant properties are necessary, and they may be installed without the need for expensive casting forms.

While the invention has been described in conjunction with specified embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. The calcium aluminate cement composition consisting essentially of (A) a mixture of from about 10 to about 30 weight percent pure calcium aluminate cement, and from about 70 to about 90 weight percent refractory aggregate; (B) from about 0.1 to about 2 weight percent, based on mixture (A), of predominantly kaolinitic clay; and (C) from about 0.05 to about 3 weight percent, based on said clay, of an anionic wetting agent.

2. The composition of claim 1 wherein said aggregate is tabular alumina.

3. The composition of claim 1 wherein said aggregate is fired kaolinite.

4. The composition of claim 1 wherein said wetting agent is an alkylaryl sulfonate.

5. The composition of claim 1 wherein (A) is about 15 weight percent pure calcium aluminate cement, and about 85 weight percent fired kaolinite aggregate; (B) is from about 0.5 to about 2 weight percent kaolinite; and (C) is about 1 weight percent of an alkylaryl sulfonate.

6. The composition of claim 1 wherein (A) is about 15 weight percent pure calcium aluminate cement, and about 85 weight percent tabular alumina aggregate; (B) is from about 0.5 to about 2 weight percent kaolinite; and (C) is about 1 weight percent of an alkylaryl sulfonate.

References Cited by the Examiner

UNITED STATES PATENTS

| 2,085,793 | 7/1937 | Coss | 106—104 |
|---|---|---|---|
| 2,339,163 | 1/1944 | Friedlaender et al. | 106—104 |
| 2,593,492 | 4/1952 | Scripture | 106—90 |
| 2,690,975 | 10/1954 | Scripture | 106—90 |
| 2,703,289 | 3/1955 | Willson | 106—90 |
| 2,912,341 | 11/1959 | Ricker | 106—104 |
| 3,097,955 | 7/1963 | Harris | 106—104 |
| 3,125,454 | 3/1964 | Dolph et al. | 106—104 |

FOREIGN PATENTS 564,061  9/1958  Canada.

TOBIAS E. LEVOW, *Primary Examiner.*